(12) United States Patent
Honeck et al.

(10) Patent No.: US 11,579,005 B2
(45) Date of Patent: Feb. 14, 2023

(54) SYSTEM FOR SENSING SUBSTANCE LEVELS IN A STORAGE UNIT

(71) Applicant: Extron Company, Minneapolis, MN (US)

(72) Inventors: Randall Gene Honeck, Maple Grove, MN (US); Haozhi Ding, Plymouth, MN (US)

(73) Assignee: Extron Company, Minneapolis, MN (US)

( * ) Notice: Subject to any disclaimer, the term of this patent is extended or adjusted under 35 U.S.C. 154(b) by 37 days.

(21) Appl. No.: 17/216,998

(22) Filed: Mar. 30, 2021

(65) Prior Publication Data

US 2021/0293601 A1    Sep. 23, 2021

Related U.S. Application Data

(63) Continuation of application No. 16/731,338, filed on Dec. 31, 2019, now Pat. No. 10,996,097, which is a continuation of application No. 15/229,797, filed on Aug. 5, 2016, now Pat. No. 10,571,326.

(60) Provisional application No. 62/202,544, filed on Aug. 7, 2015.

(51) Int. Cl.
  *G01F 23/284* (2006.01)
  *G01S 13/88* (2006.01)
  *G01S 7/40* (2006.01)

(52) U.S. Cl.
  CPC ............ *G01F 23/284* (2013.01); *G01S 13/88* (2013.01); *G01S 7/4065* (2021.05)

(58) Field of Classification Search
  CPC ....... G01F 23/284; G01S 13/88; G01S 7/4065
  See application file for complete search history.

(56) References Cited

U.S. PATENT DOCUMENTS

| | | | |
|---|---|---|---|
| 3,394,589 A | 7/1968 | Tomioka | |
| 3,807,231 A | 4/1974 | Spaw | |
| 3,876,121 A | 4/1975 | Preikschat | |
| 4,170,311 A | 10/1979 | Spaw | |
| 4,227,041 A * | 10/1980 | Den | H01B 7/04 |
| | | | 174/117 F |
| 4,293,854 A | 10/1981 | Gookins | |
| 4,583,300 A | 4/1986 | Mast | |
| 4,916,830 A | 4/1990 | Braun | |
| 5,095,748 A | 3/1992 | Gregory | |
| 5,726,578 A | 3/1998 | Hook | |
| 5,898,308 A | 4/1999 | Champion | |

(Continued)

FOREIGN PATENT DOCUMENTS

| | | |
|---|---|---|
| EP | 1801549 A2 | 6/2007 |
| EP | 2801549 B1 | 8/2014 |

OTHER PUBLICATIONS

Gray, Jim, et al., Time domain reflectometry tackles tough tank level measurements, Instrumentation & Control Systems (I&CS), Nov. 1997, vol. 70, No. 11, pp. 2 and 33-35.

(Continued)

*Primary Examiner* — David Z Huang
(74) *Attorney, Agent, or Firm* — Merchant & Gould P.C.

(57) ABSTRACT

A system for estimating a substance level in a storage unit is disclosed. In one embodiment, the system includes a cable and a control device. The control device sense pulses down the cable and based on the time of reflected pulses determines the level of substance in the storage unit.

17 Claims, 12 Drawing Sheets

(56) References Cited

U.S. PATENT DOCUMENTS

| | | | |
|---|---|---|---|
| 6,047,598 | A | 4/2000 | Otto |
| 6,229,476 | B1 | 5/2001 | Lutke |
| 6,295,018 | B1 | 9/2001 | Diede |
| 6,539,794 | B1 | 4/2003 | Otto |
| 6,690,320 | B2 | 2/2004 | Benway |
| 6,795,015 | B2 | 9/2004 | Edvardsson |
| 7,345,622 | B2 | 3/2008 | Edvardsson |
| 7,525,476 | B1 | 4/2009 | Delin |
| 7,551,122 | B1 | 6/2009 | Delin |
| 7,586,435 | B1 | 9/2009 | Edvardsson |
| 7,924,216 | B2 | 4/2011 | Edvardsson |
| 8,018,373 | B2 | 9/2011 | Edvardsson |
| 8,773,302 | B2 | 7/2014 | Edvardsson |
| 9,638,567 | B2 | 5/2017 | Fredriksson |
| 9,752,918 | B2 * | 9/2017 | Honeck .................. G01F 23/284 |
| 9,778,089 | B2 | 10/2017 | Edvardsson |
| 10,571,326 | B2 | 2/2020 | Honeck |
| 2003/0178222 | A1 | 9/2003 | Moore |
| 2004/0027137 | A1 | 2/2004 | Sherrard |
| 2005/0241391 | A1 | 11/2005 | Kull |
| 2005/0241931 | A1 | 11/2005 | Ahn |
| 2005/0264440 | A1 | 12/2005 | Smith |
| 2009/0207032 | A1 | 8/2009 | Gunthorpe |
| 2012/0137767 | A1 | 6/2012 | Silvermint |
| 2013/0009803 | A1 * | 1/2013 | Edvardsson ........... H01Q 1/225 |
| | | | 342/124 |
| 2013/0261977 | A1 | 10/2013 | Shanks |
| 2014/0104098 | A1 | 4/2014 | Linden |
| 2014/0298903 | A1 | 10/2014 | Goto |
| 2017/0038240 | A1 | 2/2017 | Huang |
| 2017/0089151 | A1 | 3/2017 | Cavalheiro |
| 2018/0017426 | A1 | 1/2018 | Honeck |

OTHER PUBLICATIONS

Brumbi, Detlef, Measuring Process and Storage Tank Level with Radar Technology, IEEE International Radar Conference, 1995, pp. 256-260_.

* cited by examiner

SYSTEM FOR SENSING SUBSTANCE LEVELS IN A STORAGE UNIT

CROSS-REFERENCE TO RELATED APPLICATIONS

This application is a continuation of U.S. patent application Ser. No. 16/731,338, filed Dec. 31, 2019, now U.S. Pat. No. 10,996,097, which application is a continuation of U.S. patent application Ser. No. 15/229,797, filed Aug. 5, 2016, now U.S. Pat. No. 10,571,326, which claims the benefit of U.S. Patent Application Ser. No. 62/202,544, filed Aug. 7, 2015, titled SYSTEM FOR SENSING SUBSTANCE LEVELS IN A STORAGE UNIT, the disclosures of which are hereby incorporated by reference in their entireties.

BACKGROUND

Storage units, such as bins, tanks, elevators, are used to hold bulk materials such as grains, woodchips, coal, etc. for storage. It is important to be able to ascertain the correct amount of substance housed in storage units. Having an accurate inventory is essential to the production of goods and therefore to the financial performance of the business.

Obtaining an accurate measurement, however, can be difficult. For example, grain is generally deposited into a grain bin from one location near the top of the container, but for various reasons, the grain inside the grain bins may come to rest in uneven, non-uniform levels. This uneven surface makes it difficult for workers to safely assess accurate volumes.

Manual measurements of grain levels can be dangerous. For example, bins can develop hazardous atmospheres, which can limit the amount of oxygen available for breathing. In addition, grain can clump together from moisture or mold, which creates an empty space beneath the grain as it is removed from the bin. The "bridging" effect that forms from this circumstance can prove to be deadly to a worker who stands on the clumped grain. If the clumped grain collapses into the open area below (the void), a worker standing on the collapsing grain could fall victim to an avalanching effect, which has the potential of burying the worker.

Systems for determining grain levels in grain bins without human interaction have been described in prior art. Single point measurements using technology such as bobs, guided wave radar, open air radar, and ultrasonic have been used to increase the accuracy of grain measurements. Multiple point measurements that implement technology such as 3D level scanners and bob systems are capable of measuring the level of grain at multiple points in the bin. Multiple point measurement systems that can scan the surface of the grain are capable of taking multiple measurements at once to better account for variations in the topography of the grain. Single and multiple point measurement systems, however, require expensive scanning hardware to be mounted to one or more points on each grain bin. The technologies used to measure the grain must be designed to not generate sparks that could ignite flammable suspended particulate matter in the grain bin.

It is thus desirable to provide a system for accurately measuring the amount of substance housed within a storage unit in real time safely, efficiently, and cost effectively.

SUMMARY

In general terms, this disclosure is directed to detecting the amount of substance in a storage unit. In one possible configuration and by non-limiting example, the present disclosure describes a novel system for estimating the amount of a substance in a storage unit that employs transmission line theory and in particular time domain reflectometry.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

One aspect is a system for measuring the amount of a substance in a storage unit. The system includes a cable configured to extend at least partially within the substance in the storage unit, the cable including at least one conductor extending along a length of the cable; and a control device connected to the cable, the control device including: a signal generator configured to generate a signal and apply the signal to the cable, the signal configured to be reflected at a level of the substance in the storage unit; a receiver configured to detect the reflection of the signal; and a processor configured to measure a delay between the applied signal and the reflected signal and calculate the amount of the substance in the storage unit based on the time delay.

Another aspect is a cable for use in a system for estimating the amount of a substance in a storage unit. The cable includes a jacket having a non-circular cross sectional shape and configured to contact a substance contained in a storage unit; and a pair of conductors arranged in parallel along a length of the cable and configured to transmit a pulse generated from a time-domain reflectometry based control device and transmit a reflected pulse back to the time-domain reflectometry based control device, the conductors being surrounded by the jacket and disposed at opposite end portions of the jacket in cross sectional view, wherein the reflected pulse is generated at a level of the substance that surrounds the jacket of the cable within the storage unit.

Yet another aspect is a method of measuring a substance within a storage unit. The method includes generating, using a pulse generator, a pulse and transmitting the pulse down a cable, the cable having one or more conductors and extending through the substance within the storage unit; receiving a reflected pulse that travels to a return route up the cable; generating a detect signal based on the reflected pulse; ascertaining a total signal travel time; and determining the level of the substance based on the ascertained signal travel time.

DETAILED DESCRIPTION

Figure 1:
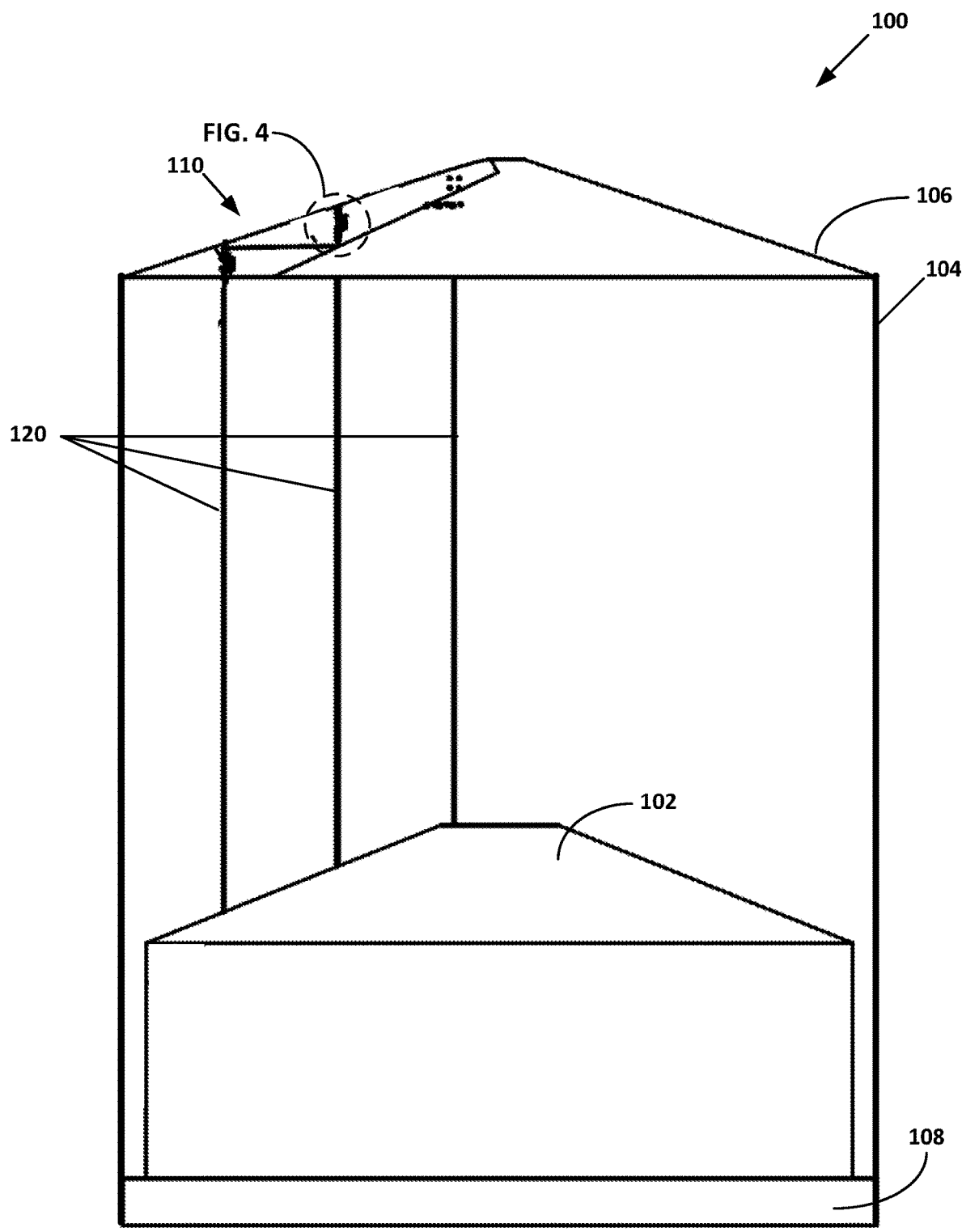
FIG. 1 is a schematic front diagram of an example substance amount detection system.

Various embodiments will be described in detail with reference to the drawings, wherein like reference numerals represent like parts and assemblies throughout the several views. The example embodiments set forth in this specification are not intended to be limiting and merely set forth some of the many possible embodiments for the appended claims.

Figure 2:
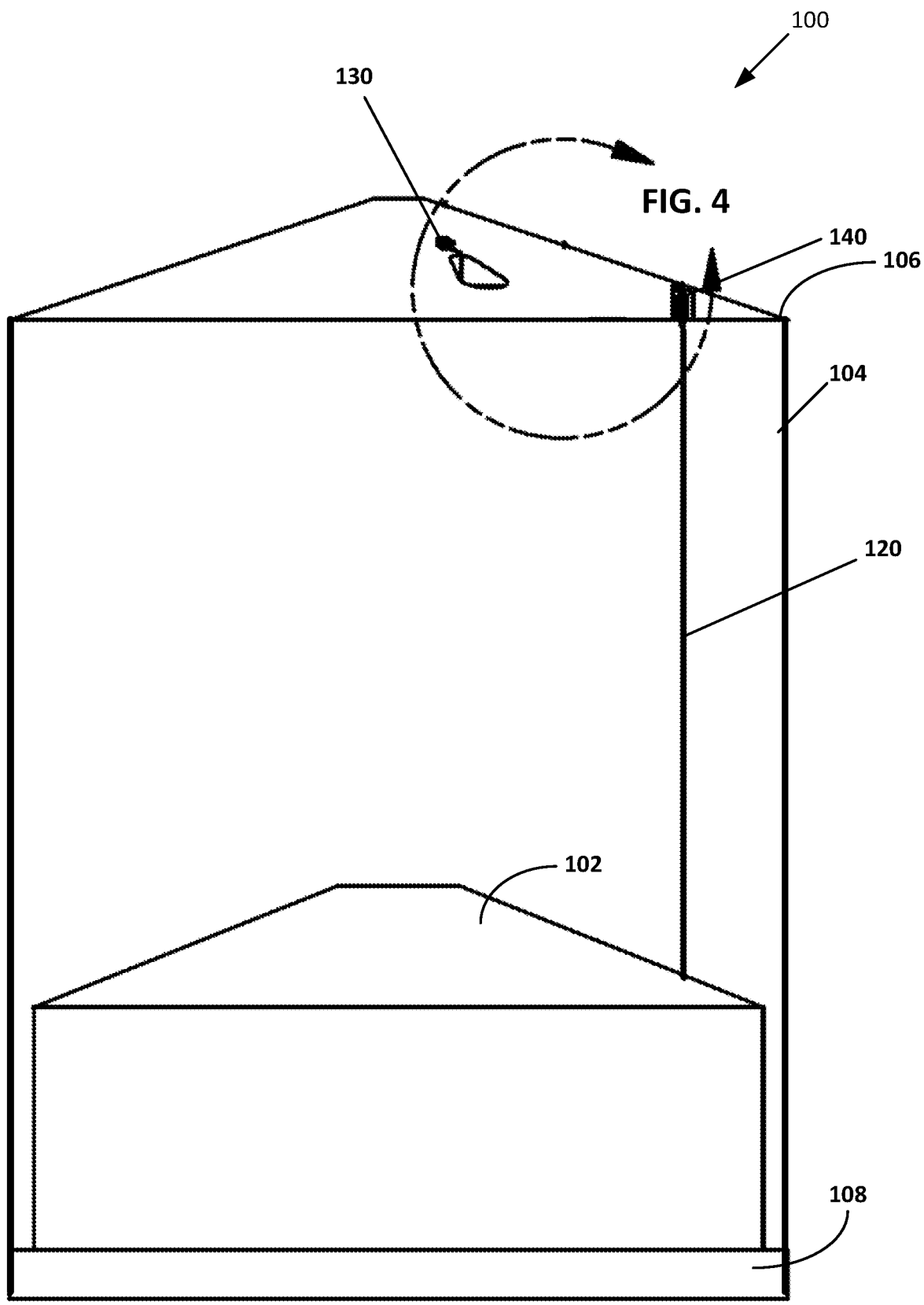
FIG. 2 is a schematic rear diagram of the system of FIG. 1.

Referring to FIGS. 1 and 2, a substance amount detection system 100 is described in accordance with an example embodiment of the present disclosure. In particular, FIG. 1 is a schematic front diagram of an example substance amount detection system 100, and FIG. 2 is a schematic rear diagram of the system 100 of FIG. 1. In the specific embodiment described herein, the system 100 operates to detect the amount of a substance or material 102 at least partially stored in a storage unit 104.

The storage unit 104 is configured to at least partially store a substance 102. In some embodiments, the storage unit 104 can be a compartment of various types, such as bins, tanks, elevators, terminals, and silos. The storage unit 104 can be used to hold bulk materials such as grains, woodchips, coal, etc. for storage. For example, in the agricultural context, the storage unit 104 can be a grain storage unit, which is also referred to as a grain elevator, a grain bin, or a grain terminal, and is configured to store various forms of substances such as wheat, rice, corn. In other embodiments, the storage unit 104 is configured to store liquid materials such as oil, ethanol, water or other liquid substances.

The substance 102 can be of various forms. In one embodiment, the substance 102 is a flowable substrate, such as grains, woodchips, coal, and any other movable particles. In other embodiments, the substance 102 is a fluidic substance, such as oil, ethanol, water, powder, gas, or other fluidic or liquid substances. In other embodiments, the substance 102 is a flowable substrate, such as grains, woodchips, coal, and any other movable particles. In this document, the term grain can be used to refer to any type of substance. Likewise, the term "grain bin" can also be used herein to refer to all structures for storing substances.

The system 100 further includes a control system 110 and one or more cables 120 to detect the amount of a substance 102 in the storage unit 104. The control system 110 is connected to the cables 120 at one end, and the cables 120 are configured to extend down toward a bottom portion or floor of the storage unit 104. In one possible embodiment, the cables 120 are configured to extend from a top portion 106 of the storage unit 104 to the bottom portion 108 of the storage unit 104, and the control system 110 is electrically connected to the cable 120 at the top portion of the storage unit 104.

The system 100 includes a plurality of cables 120, which are spaced apart from each other and extend down at different locations in the storage unit 104. Since the level of the substance 102 can be different in the storage unit 104, multiple cables 120 at different locations can be used to measure different heights of the substance 102 at such locations in the storage unit 104. In other possible embodiments, the system 100 can include a single cable 120, which are horizontally movable within the storage unit 104 to measure the level of the substance 102 at different locations in the storage unit 104. In yet other embodiments, the system 100 can use a single cable 120 where the substance 102 is contained to have a constant level or height in the storage unit 102.

The control system 110 is connected to one or more cables 120 and configured to detect the level of the substance 102 using the cables 120. In some embodiments, the control system 110 is positioned at the top portion 106 of the storage unit 104. In other embodiments, the control system 110 can be located in other portions of the storage unit 104.

In some embodiments, the control system 110 can be located outside the storage unit 104. In other embodiments, the control system 110 can be located inside the storage unit 104. In yet other embodiments, some parts, elements or components of the control system 110 are located outside the storage unit 104, and the other is located inside the storage unit 104. For example, as shown in FIG. 2, a control device 130 of the control system 110 is located outside the storage unit 104, and a switch device 140 of the control system 110 is arranged inside the storage unit 104.

Figure 3:
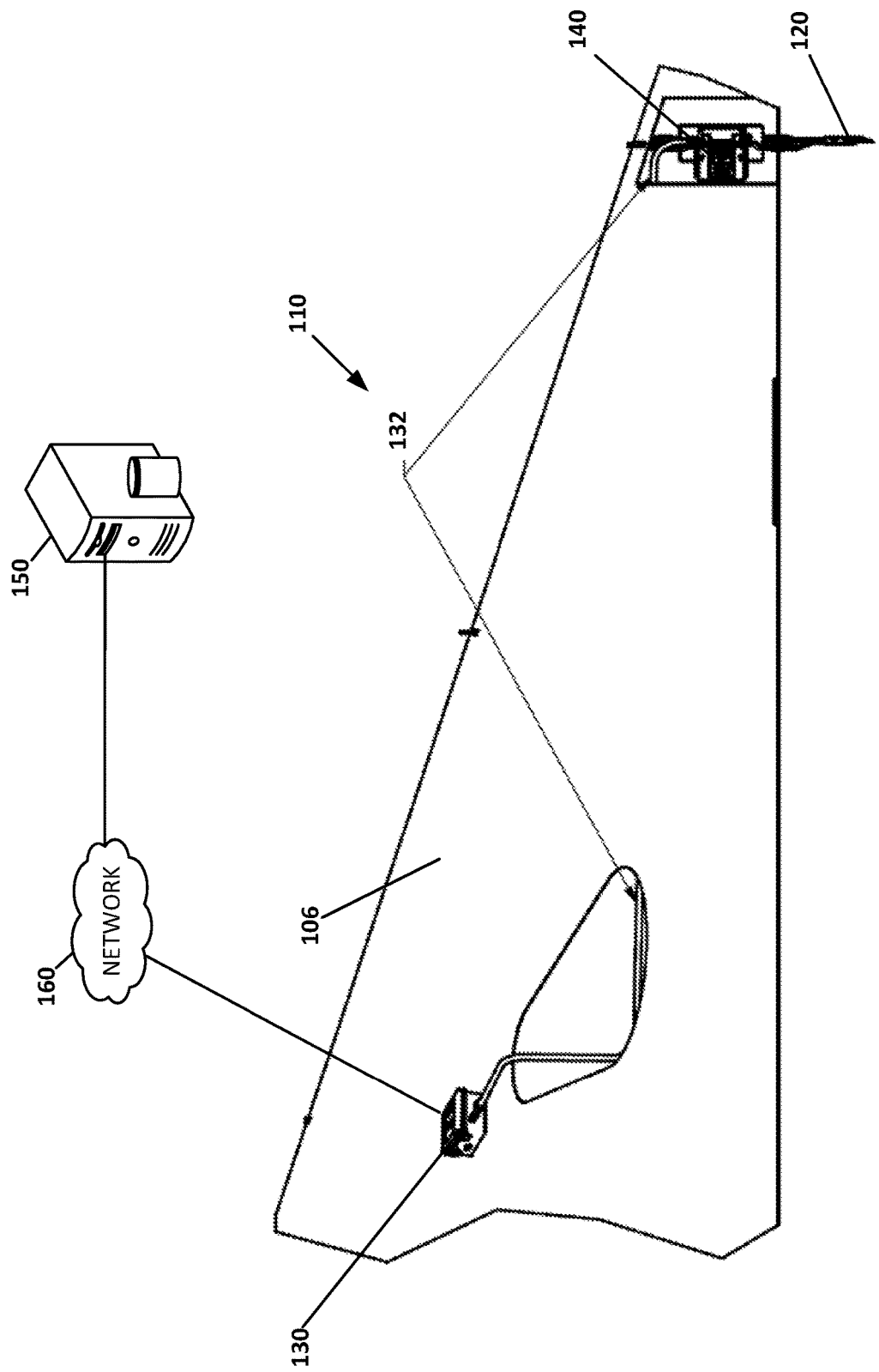
FIG. 3 is a schematic diagram of a control system arranged at a storage unit.

FIG. 3 is a schematic diagram of the control system 110 arranged at the top portion 106 of the storage unit 104. The control system 110 includes a control device 130 and a switch device 140 connected to the control device 130. In this embodiment, the control device 130 is arranged at the exterior surface of the top portion 106 of the storage unit 104 while the switch device 140 is arranged inside the storage unit 104. As described herein, the switching 140 is coupled to an end of the cable 120 and hung to the top portion 106 of the storage unit 104 so that the cable 120 extends down toward the bottom portion 108 of the storage unit 104. In some embodiments, a flexible conduit 132 can run between the control device 130 located outside the storage unit 104 and the switch device 140 located inside the storage unit 104, so that an electrical connection is made between the control device 130 and the switch device 140.

The control system 110 can further include a computing device 150 that can communicate with the control device 130 via a data communication network 160. In some embodiments, the computing device 150 is operable by a user to remotely control the control device 130, and process and manage data from the control device 130. For example, the computing device 150 operates to process the data, such as measurement data, transmitted from the control device 130 and evaluate the data to estimate the amount of the substance 102 within the storage unit 104.

The data communication network 160 communicates digital data between one or more computing devices or circuits, such as between the control device 130 and the computing device 150. Examples of the network 160 include a local area network and a wide area network, such as the Internet. In some embodiments, the network 160 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 4:
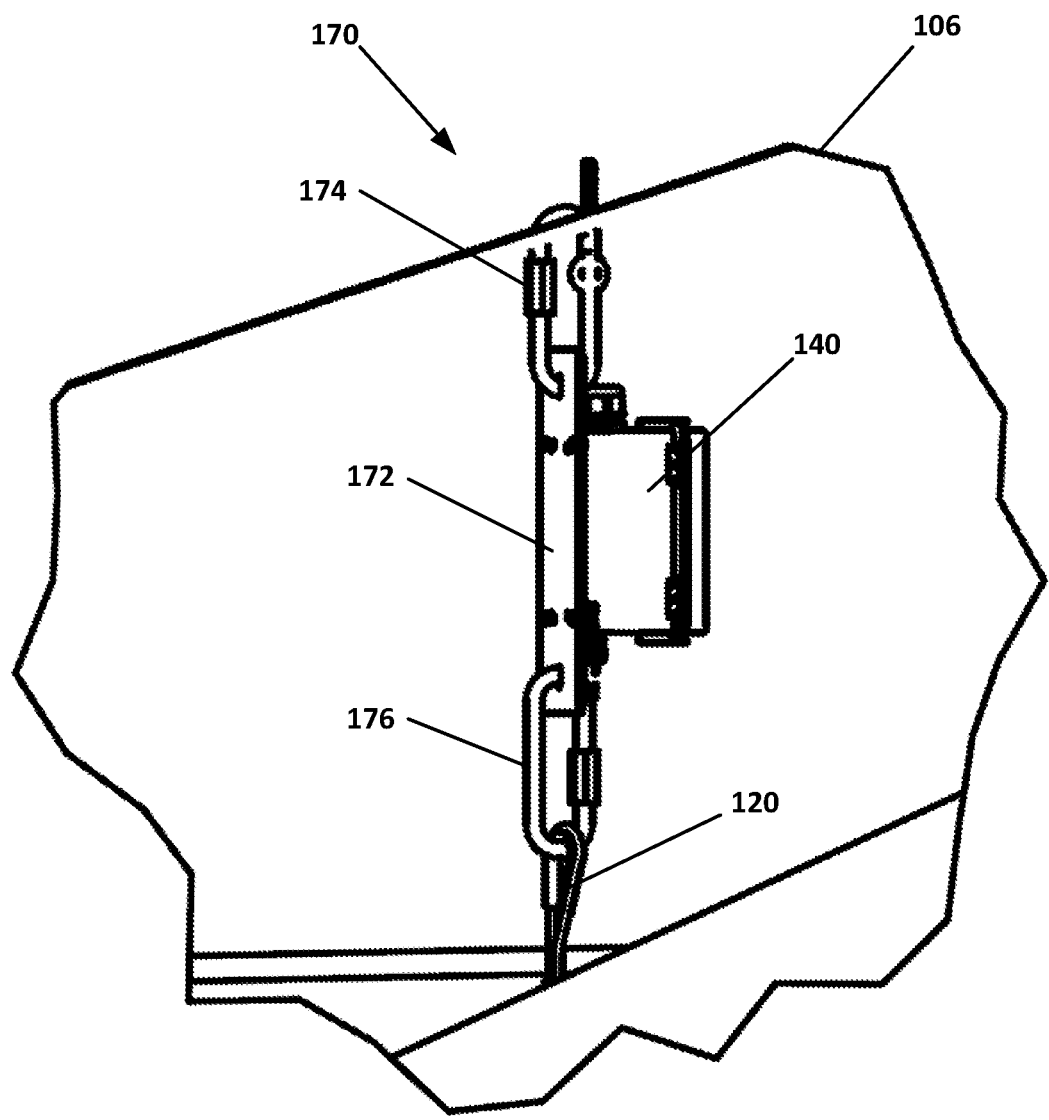
FIG. 4 schematically illustrates an example coupling device for placing the control system in the storage unit.

FIG. 4 schematically illustrates an example coupling device 170 for arranging the control system 110 in the storage unit 104. In the illustrated embodiment, the coupling device 170 includes a mounting body 172 configured to mount the switch device 140. The mounting body 172 can be configured to mount other parts or components of the control system 110. The mounting body 172 can be coupled to the top portion 106 of the storage unit 104 using a coupler 174, such as a carabiner or other clamping device. The mounting body 172 is configured to connect the cable 120 using a coupler 176, such as a carabiner or other clamping device. When the mounting body 172 is coupled to the top portion 106 of the storage unit 104, the cable 120 extends vertically by gravity, from the top portion 106 toward the bottom portion 108 of the storage unit 104.

Figure 5:
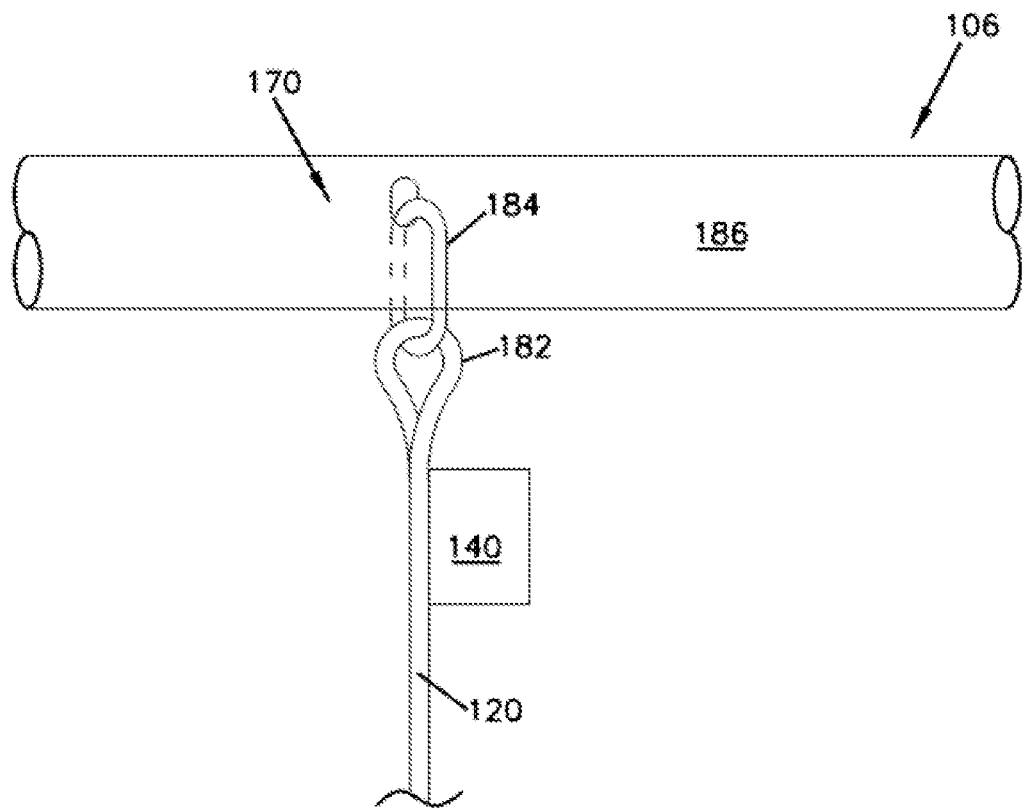
FIG. 5 schematically illustrates another example of the coupling device for placing the control system in the storage unit.

FIG. 5 schematically illustrates another example of the coupling device 170 for arranging the control system 110 in the storage unit 104. In this embodiment, the cable 120 extends vertically from the top portion 106 of the storage unit 104 to the bottom portion 108 of the storage unit 104. In one embodiment of the present disclosure, the switch device 140 is attached to a top end portion of the cable 120. The cable is constructed such that it can be hung from the rafters of the storage unit 104. In the depicted embodiment, the cable includes an eyelet 182 that can be attached to a link 184 that extends through or around a rafter support member 186. The weight force on the link 184 would be the weight of the cable plus the drag force on the cable due to the friction between the grain and the exterior surface of the cable 120. The force on the link 184 can in some embodiment be between 500 pounds and 2000 pounds.

Figure 6:
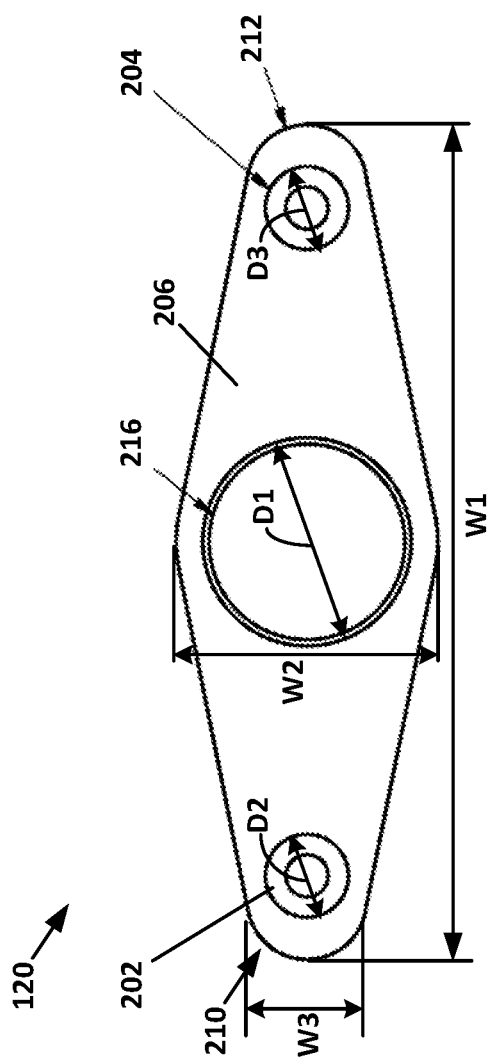
FIG. 6 is a schematic cross sectional view of a cable.

FIG. 6 is a schematic cross sectional view of an example of the cable 120. When the control system 110 generates and applies a signal to the cable 120, the cable 120 is configured to transmit a signal along the length thereof. The signal can be reflected at a point where the cable 120 meets the substance 102 of the storage unit 104, and return to the control system 110, as described herein. The control system 110 and/or the computing device 150 can then evaluate the reflected signal and calculate the amount of the substance in the storage unit 104.

In the illustrated embodiment, the cable 120 includes a pair of conductors, such as a first conductor 202 and a second conductor 204, which are surrounded by a jacket 206. The conductors can be arranged in parallel along a length of the cable. The jacket 206 can work as an insulator. The jacket 206 has a non-circular cross section. For example, the jacket 206 is configured such that a first width W1 in a first direction is different from a second width W2, W3 in a second direction perpendicular to the first direction. In one possible embodiment, the jacket 206 is shaped to be oval or rectangular. This cross sectional shape can reduce drag forces exerted by the substance 102 to the surface of the cable 120. In one example, the first width (the largest width) W1 is from about 0.5 inches to about 2.215 inches, while the second width W2 (the second largest width) is from about 0.1 inches to about 0.5 inches. In another example, the first width (the largest width) W1 is from about 0.5 inches to about 2.215 inches, while the width W3 is from about 0.1 inches to about 0.5 inches. Although it is primarily illustrated herein that a pair of conductors is used in the cable 102, it is also possible in other embodiments that three or more conductors are used in the cable 102.

The pair of conductors 202, 204 can be positioned at the opposite sides of the jacket 206 in cross sectional view. In the illustrated embodiment, the first conductor 202 is arranged at a first end portion 210 of the jacket 206, and the second conductor 204 is arranged at a second end portion 212 opposite to the jacket 206 in the direction of the first width W1.

In some embodiments, the first and second conductors 202 and 204 are spaced apart at a predetermined distance L1 for reducing interference between the conductors. In one example, the distance L1 between the first conductor 202 and the second conductor 204 is 20 millimeters. The distance L1 can vary depending on the gauge of the copper wires. In one example, the first and second conductors 202 and 204 are identical and have a size of about 10 AWG to 22 AWG. In another example, the first and second conductors are sized about 16 AWG.

The first and second conductors 202 and 204 are arranged adjacent the end portions 210, 212 of the jacket 206 to be affected by a substance 102 surrounding the cable 120. As described herein, where the cable 120 is surrounded by, or in contact with, a substance 102 in the storage unit 104, the substance 102 can cause change in impedance of the conductors. A signal transmitting through the conductors can be reflected at a point that the impedance changes. To improve sensitivity of the cable 120 by a substance 102 in the storage unit 104, the conductors 202, 204 can be disposed as close to the end portions of the cable as possible. The end portions of the cable that surround the conductors can be configured to be thinner so that the conductors better react to the influence by the substance surrounding the cable, thereby changing impedance thereof.

In some embodiments, the cable 120 can have different widths in a particular direction. For example, as illustrated in FIG. 6, the cable 120 has a width W2 in the center that is greater than widths W3 in the opposite end portions 210 and 212 of the jacket. Thus, the cable 120 is thicker in the center and gets gradually thinner toward the end portions 210 and 212 at which the conductors 202 and 204 are arranged. In other embodiments, the width W2 of the cable 120 in the center can be the same as the widths W3 of the end portions of the cable, or narrower than the widths W3 of the end portions of the cable.

In some embodiments, the cable 120 includes a strength member 216 that is used to provide sufficient strength to the cable against large forces acting on the cable in the storage unit 104. The strength member 216 can be arranged between the conductors 202 and 204. In some embodiments, the strength member 216 has a larger diameter D1 than the diameters D2 and D3 of the first and second conductors 202 and 204. The diameter D1 of the strength member can be equal to or less than a third of the largest width W1 of the cable. The strength member 216 can be made from non-metallic and non-magnetic. The strength member 216 includes non-ferrous materials to prevent interference to the signals through the conductors. One example of the strength member 216 includes para-aramid fibers, such as Kevlar and Twaron.

In some embodiments, the jacket is made from abrasion resistance material. In one example, the jacket has a dielectric constant less than 8. In another example, the jacket has a dielectric constant less than 15. For example, the jacket is made of polyvinylidene fluoride (PVDF). In another example, the jacket is made of high density polyethylene.

Figure 7:
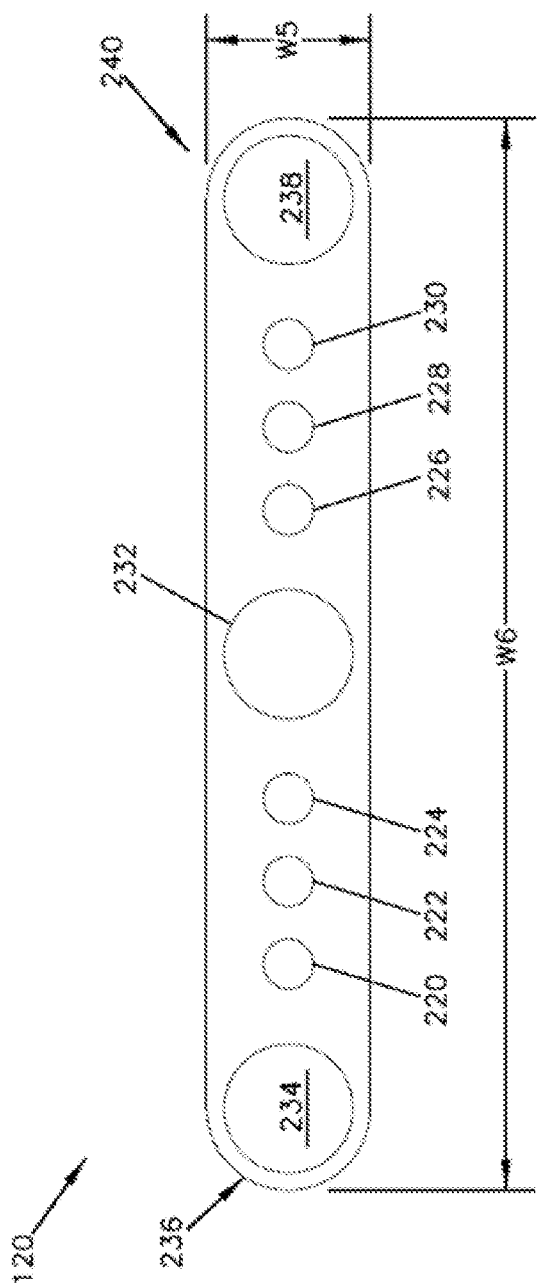
FIG. 7 is a schematic cross sectional view of another example of the cable.

FIG. 7 is a schematic cross sectional view of another example of the cable 120. As described above, given the large forces acting on the cable 120, the cable 120 is constructed to minimize drag forces, which also includes strengthening members. In the depicted embodiment, six strengthening members 220, 222, 224, 226, 228, 220 are provided in the cable. In some embodiments, the strength members are co-molded with the cable 120. The strengthening members can be a non-ferrous material such as an aramid fiber (e.g., Vectran Fiber) or other similar materials. In the depicted embodiment, the body (i.e., jacket) of the cable 120 has an oval cross sectional shape and is constructed of a nylon material (e.g., extruded 6/12 nylon). The cross sectional width of the body W5 in one direction is narrow (e.g., between 0.10 to 0.15 inches) and the width W6 in the other direction is relatively larger (e.g., between 0.8 to 1.1 inches). In the depicted embodiment, the width W5 is 0.13 inches and the width W6 is 0.94 inches. A thermocouple line 232 can be provided in the center body portion of the cable 120.

As shown, the cable 120 includes a first conductor 234 located at a first end portion 236 and a second conductor 238 located at a second end portion 240. In the depicted embodiment, the first conductor 234 and second conductor 238 are 16 gauge stranded copper wires. The distance between the first conductor 234 and second conductor 238 is 20 millimeters, which is correlated to the gauge of the copper wires.

In other possible embodiments, the cable 120 includes a single conductor. In yet other possible embodiments, the cable 120 includes more than two conductors.

In some embodiments, the cable includes a plurality of thermocouples located in the cable between the pair of conductors. In the depicted embodiment, the thermocouples are positioned between the groups of strengthening members. In such embodiments, the cable can include a conductor that connects to the plurality of thermocouples located in the cable. The conductor can be located in the center of the cable between the pair of conductors.

In one possible embodiment, the cable has an oval cross section. In the depicted embodiment the cross-sectional width of the cable is between one hundred ten percent and three hundred percent of the cross sectional diameter of the copper conductors. In the depicted embodiment, the cross sectional width of the cable is at between five hundred to fifteen hundred percent the cross sectional diameter of the copper conductors.

In one possible embodiment, the pair of conductors are 16 gauge stranded copper wires and the consistent distance between the wire is 20 mm, wherein the cross sectional length of the cable is 0.94 inches and the cross sectional width of the cable is 0.120 inches, wherein the strength members have a diameter of 0.07 inches and wherein there are six strength members in a row arranged in two groups of three positioned adjacent the copper wires.

In some examples, an alternative design of the cable 120 is also possible. For example, the cable 120 do not include the strengthening members 220, 222, 224, 226, 228, 220 when the cable 120 do not require additional strength along the cable, such as where the cable 120 is used to measure a liquid substance in the storage unit. The cable 120 can also be configured without the thermocouple line 232.

Figure 8:
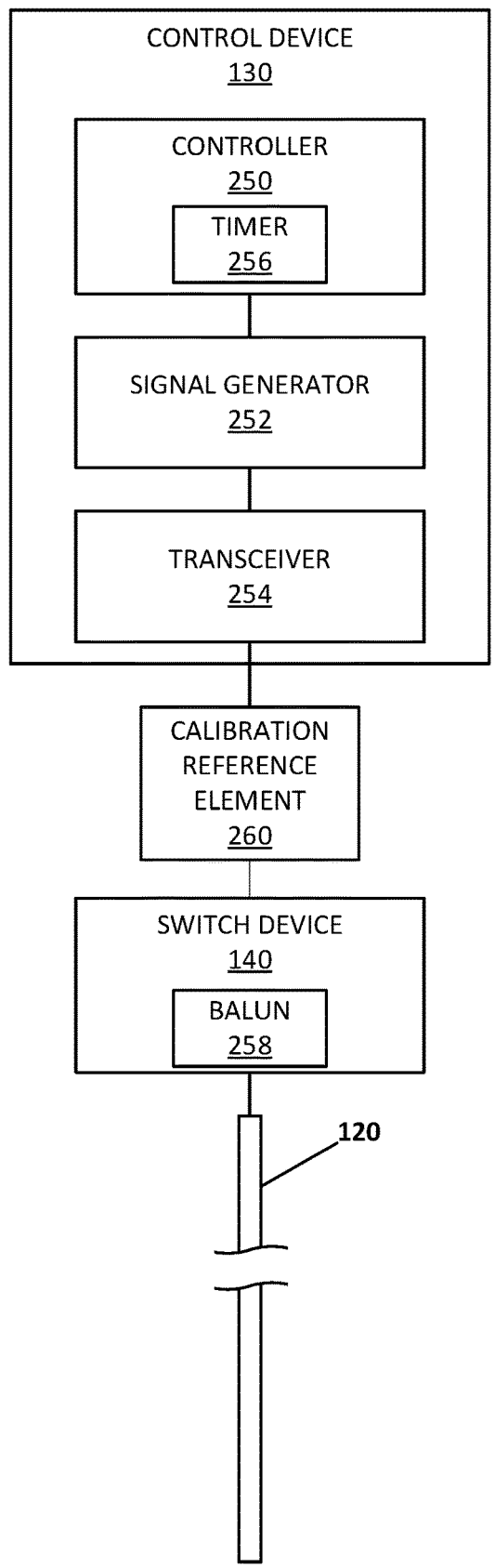
FIG. 8 is a block diagram of a substance amount detection system.

FIG. 8 is a block diagram of the substance amount detection system 100. In this embodiment, the system 100 includes a control device 130, a switch device 140, and one or more cables 120. The control device 130 can include a processor 250, a signal generator 252, a transceiver 254, and a timer 256. The switch device 140 can include a balun 258. The cable 120 is coupled to the switch device 140. Between the control device 130 and the switch device 140 is connected a calibration reference element 260.

In some embodiments, the system 100 of the present disclosure employs time-domain reflectometry (TDR) or the principles as used in a time-domain reflectometer to measure reflections along a conductor that extends through a substance in the storage unit. In this document, therefore, the control device is also referred to as a time-domain reflectometry based control device.

Time-domain reflectometry (TDR) is a measurement technique used to determine the characteristics of electrical lines by observing reflected waveforms. There are variations of TDR. For example, spread-spectrum time-domain reflectometry (SSTDR) is used to detect intermittent faults in complex and high-noise systems such as aircraft wiring. Coherent optical time domain reflectometry (COTDR) is another variant, used in optical systems, in which the returned signal is mixed with a local oscillator and then filtered to reduce noise.

The TDR analysis begins with the propagation of a step or impulse of energy into a system and the subsequent observation of the energy reflected by the system. By analyzing the magnitude, duration and shape of the reflected waveform, the nature of the impedance variation in the transmission system can be determined. For example, the impedance of the discontinuity can be determined from the amplitude of the reflected signal. The distance to the reflecting impedance can also be determined from the time that a pulse takes to return. The total rise time consists of the combined rise time of the driving pulse and that of the oscilloscope or sampler that monitors the reflections.

In applications of the storage unit of the present disclosure, at the height or level that the substance 102 meets the cable 120 within the storage unit 104, the substance 102 can contact the jacket of the cable 120 and change the impedance of the cable 120. For example, one or more properties of the substance 102 can affect the cable 102 and change the impedance provided by the conductors included in the cable 102. Such properties of the substance 102 include moisture contained in the substance 102. The change in impedance at the level of the substance, which first meets the cable within the storage unit, permits a signal, such as a pulse, to reflect at the level of the substance.

In order to measure such reflection, the system transmits an incident signal (e.g., pulses) onto the conductors of the cable and listens for its reflection. Where the conductors are of uniform impedance and are terminated before the cable reaches the substance in the storage unit or there is no substance in the storage unit, the cable can maintain the same impedance. Thus, there is no reflection and the remaining incident signal will be absorbed at the far-end by the termination. However, where there are impedance variations resulting from the contact with the substance with the storage unit, then a portion of the incident signal can be reflected back at the contact and transmitted back to the source.

In the depicted embodiments, a twin-lead cable consisting of a pair of conductors held apart by a continuous insulator is employed. By holding the conductors a known distance apart, the geometry is fixed and the line characteristics are reliably consistent. A reflection of the pulse that is transmitted down the cable is sent back up the cable once the pulse reaches the point in which the cable enters the substance.

In some embodiments, the reflection generally has the same shape as the incident signal (pulse), but the sign and magnitude of the reflection can depend on the change in impedance level. If there is a step increase in the impedance, then the reflection will have the same sign as the incident signal; if there is a step decrease in impedance, the reflection will have the opposite sign. The magnitude of the reflection depends not only on the amount of the impedance change, but also upon the loss in the conductor.

In some embodiments, the reflection is displayed or plotted as a function of time. Alternatively, the display can be read as a function of cable length because the speed of signal propagation is almost constant for a given transmission medium. Because of its sensitivity to impedance variations, the system may be used to verify cable impedance characteristics and estimate cable lengths above the foldable substrate.

Referring still to FIG. 8, the processor 250 operates to control various components in the system 100, such as the signal generator 252, and calculate the amount of the substance in the storage unit based at least on the cable configuration (e.g., length) and the time delay associated with the transmitted and reflected signal. The signal generator 252 is configured to generate a signal, such as a pulse, down the calibration reference element 260, the cable 120, or both of the calibration reference element 260 and the cable 120. The transceiver 254 is configured to transmit a signal generated by the signal generator 252 and detect a reflection of the sent signal. The timer 256 is configured to measure a time delay between the signal being sent and the reflection received. In other embodiments, the processor 250 can be configured to time the pulses sent such that the reflection is isolated and therefore can be more clearly detected.

The calibration reference element 260 is used to calibrate the system 100 before measuring the level or height of the substance in the storage unit. In the depicted embodiment, the calibration reference element 260 is connected between the transceiver 254 and the switch device 140. In the embodiments, the calibration reference element 260 can be arranged differently.

The calibration reference element 260 includes a conductor with a known length. As described herein, in the calibration mode, the system 100 transmits a signal to the conductor of the calibration reference element 260 and detects a reflected signal from the conductor of the calibration reference element 260 to calculate a time delay of the signal. Since the length of the conductor is known, the calculated time delay can be used to calibrate the system.

In one embodiment, the calibration reference element 260 is configured as a cable. One example of such a cable is a coaxial cable with a known length. In some embodiments, the coaxial cable is routed between the control device 130 and the switch device 140. The coaxial cable can be of various specifications and lengths. Examples of the coaxial cable include RG-6, RG-58, RG-59, and other similar cables. In some possible examples, the coaxial cable has a length of around 5 ft to around 500 ft. In other examples, the coaxial cable has a length of about 10 ft to about 25 ft.

In another embodiment, the calibration reference element 260 is configured as a serpentine trace formed on a circuit board. A length of the serpentine trace is predetermined and known for calibration. For example, such a serpentine trace can be incorporated into one or more circuits of the control device 130 and/or the switch device 140. In other examples, the serpentine trace is formed in one or more other circuits in the system 100. In yet other examples, a separate circuit is provided to form the serpentine trace. The serpentine trace is of various configurations. In some examples, the serpentine trace is 10 ft, and yet in other examples, the serpentine trace is 15 ft. As is understood, the serpentine trace is a single trace having an approximately 75 ohm impedance. Other impedance can be possible with the serpentine trace.

With continued reference to FIG. 8, the switch device 140 is configured to switch between a calibration mode and a measurement mode. In the calibration mode, the switch device 140 operates to electrically disconnect the cable 120 so that the system 100 performs calibration using the calibration reference element 260. In the measurement mode, the switch device 140 operates to electrically connect the cable 120 to the control device 130 and detect the level of the substance within the storage unit.

The switch device 140 can include a balun 258, which is configured to converts between a balanced signal (e.g., two signals working against each other where ground is irrelevant) and an unbalanced signal (e.g., a single signal working against ground or pseudo-ground). A balun can be used to connect lines of different impedance. In the depicted embodiment, where the calibration reference element 260 and the cable 120 have different impedance, the balun 250 operates to transmit signals therebetween.

Figure 9:
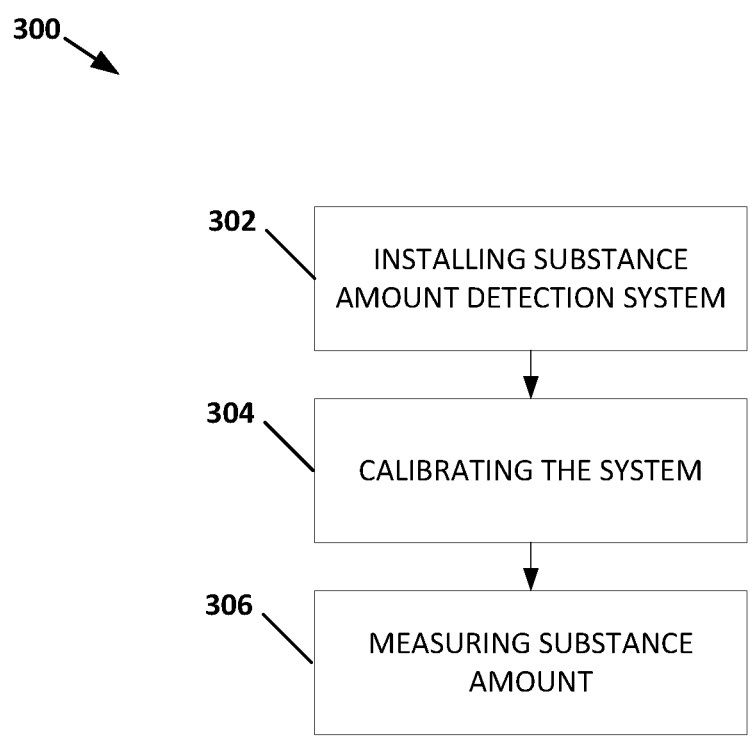
FIG. 9 is a block diagram of an example method for using the substance amount detection system.

FIG. 9 is a block diagram of an example method 300 for using the substance amount detection system 100. The method 300 can begin at operation 302, in which the system 100 is installed with a storage unit 104. As depicted, in one embodiment, at least part of the system 100 can be installed at the top portion of the storage unit 104. The control device 130 and the switch device 140 are connected to a top portion of the cable 120, and the calibration reference element 260 is routed between the control device 130 and the switch device 140. The installation can be done before or after the substance is filled in the storage unit.

When the control device and/or the switch device 140 are connected to the top portion of the storage unit 104, the cable 120 is arranged to extend down toward the bottom of the storage unit 104. In some examples, the cable is brought down as far as it can reach. In other examples, the cable extends close to the floor of the storage unit, or being in contact with the floor of the storage unit. In some possible embodiments, a weight is provided and connected to the end of the cable so that the cable extends as straight as possible by gravity within the storage unit. Other devices can be used to make the cable properly extend down within the storage unit.

At operation 304, the system 100 performs calibration. In the calibration mode, the switch device 140 electrically disconnects the cable 120. An example process is described with reference to FIG. 10.

At operation 306, the system 100 performs measurement of the substance amount within the storage unit. In the measurement mode, the switch device 140 electrically connects the cable 120. An example process is described with reference to FIG. 11.

Figure 10:
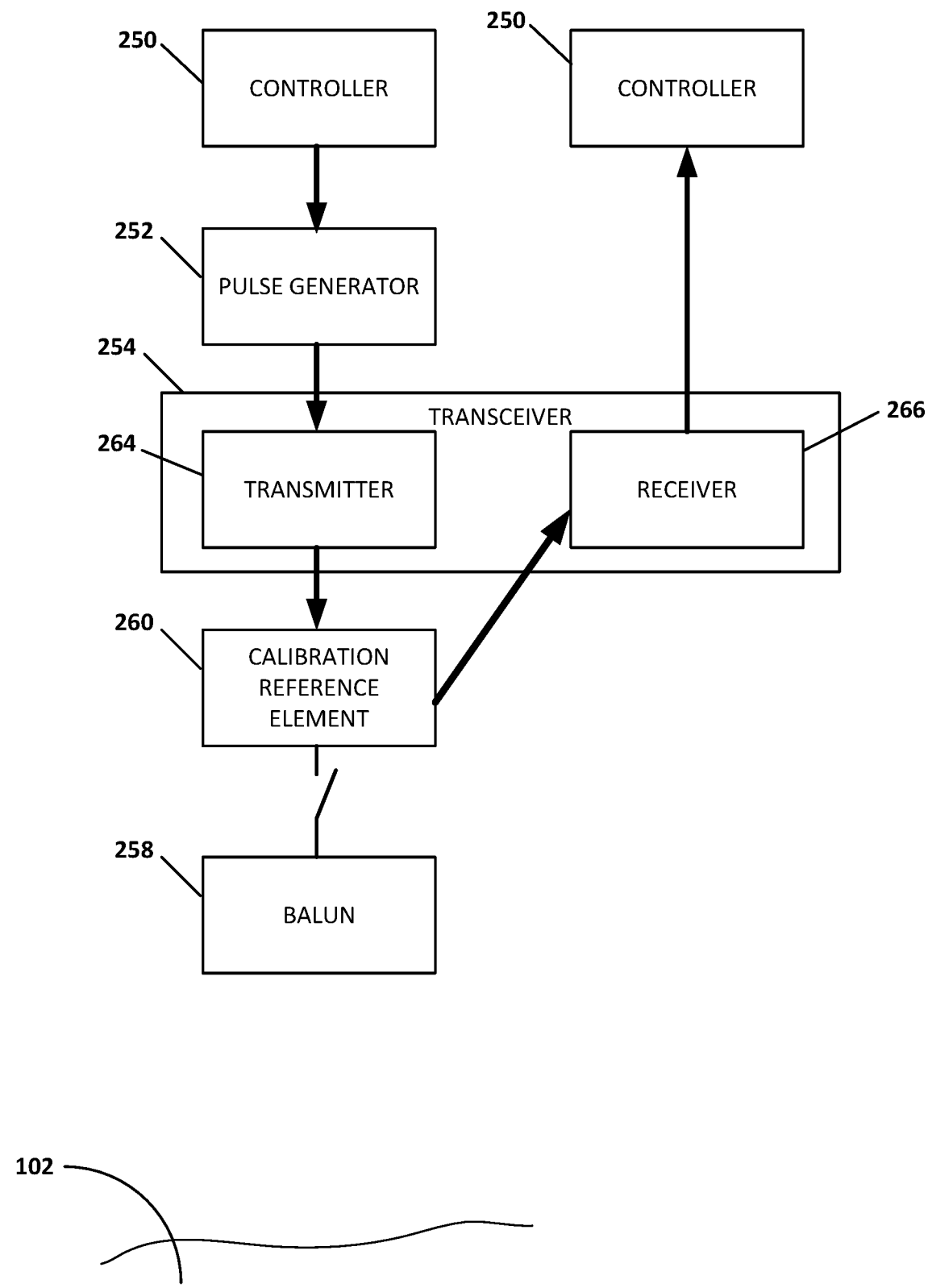
FIG. 10 illustrates an example operation of the system in a calibration mode.

FIG. 10 illustrates an example operation of the system in the calibration mode. In the calibration mode, the processor 250, such as a PIC microcontroller, generates a start signal that is sent to the signal generator 252, such as a pulse generator. It is understood that the start signal is sent to the pulse generator based in part on inherent limitations of the microprocessor. In alternative embodiments, the microprocessor is capable of generating the desired pulse, and in such an embodiment, no additional pulse generator is required. In the embodiment in which the microprocessor sends a start signal to the pulse generator, upon receiving the signal from the microprocessor, the pulse generator generates a pulse of a desired duration (e.g., a 10 ns pulse). The pulse thereafter travels to a transmitter 264 (in the transceiver 254), which transmits the pulse to the calibration reference element 260, such as a coaxial cable or a serpentine trace on a circuit board. Since the cable 120 is electrically disconnected in the calibration mode, the pulse is reflected at the end of the calibration reference element 260 and transmitted back to the receiver 266 (in the transceiver 254). In other embodiments, the cable 120 is electrically disconnected from the balun, and the calibration pulse can be reflected at the balun. The processor 250 detects the reflected pulse, and calculates the delay between a time of the pulse generation and the time of the reflected pulse. Since the length of the calibration reference element 260 is known, the processor 250 can evaluate the accuracy of the delay and use the same to calibrate the system.

As such, in the calibration mode, the twin-lead conductors of the cable can be shorted back to the balun on a return side of the circuit. Such a short allows for calibration of the system by determining the propagation delay associated with the pulse traveling through the circuit. Accordingly, the time it takes the pulse to travel through the transmitter, the serpentine trace, the balun, and back through to the receiver and ultimately to the microprocessor can be determined.

Figure 11:
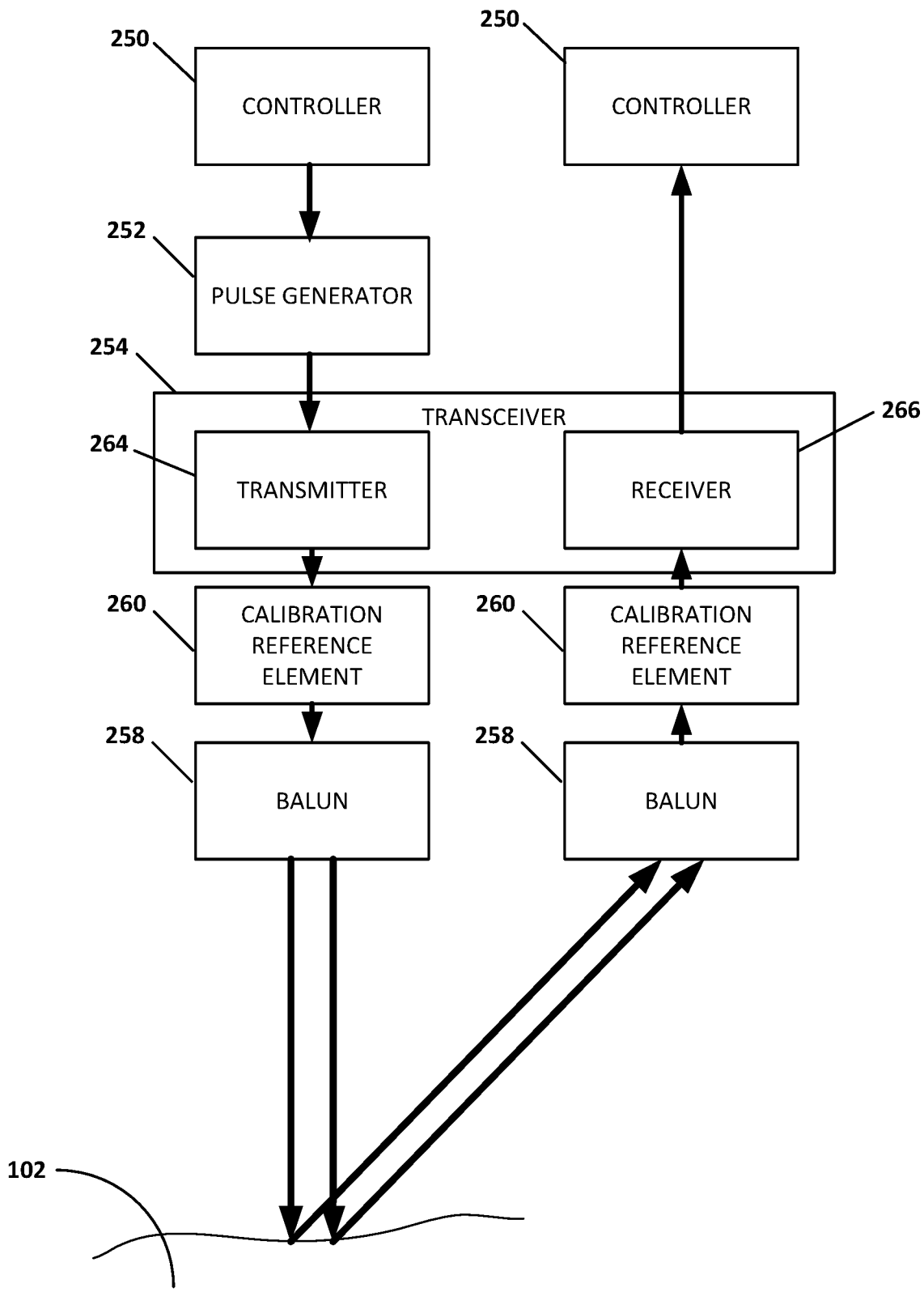
FIG. 11 illustrates an example operation of the system in a measurement mode.

FIG. 11 illustrates an example operation of the system in the measurement mode. In the measurement mode, the method for detecting the level or amount of substance in the storage unit can begin with the processor 250, such as a PIC microcontroller, generating a start signal that is sent to the signal generator 252, such as a pulse generator. It is understood that the start signal is sent to the pulse generator based in part on inherent limitations of the microprocessor. In alternative embodiments, the microprocessor is capable of generating the desired pulse, and in such an embodiment, no additional pulse generator is required.

In the embodiment in which the microprocessor sends a start signal to the pulse generator, upon receiving the signal from the microprocessor, the pulse generator generates a pulse of a desired duration (e.g., a 10 ns pulse). The pulse thereafter travels to the transmitter 264, which transmits the pulse the calibration reference element 260. The signal then travels to the balun 258 in which the signal is divided onto the disclosed twin-lead conductors of the cable, each of which has, for example, approximately 300 ohm impedance.

Then, the pulse travels from the balun to the conductors of the cable 120 until it reaches a point of the cable that is surrounded by the substance (e.g., grain). In this embodiment, upon reaching the point of the cable, the pulse reflects back through the circuit. In particular, the pulse travels back to the balun, and through the calibration reference element 260. Thereafter, the pulse travels to the receiver 256 that generates a detect signal. In some embodiments, the receiver is a threshold detector configured to generate a detect signal upon detection of a reflected pulse that meets a minimum threshold. A minimum threshold ensures any noise does not unnecessarily cause the generation of the detect signal. The detect signal is detected by the processor 250, which calculates the height of the substance 102 based on the time of reflection.

In some embodiments, the timer is configured with a capacitor that receives a consistent voltage when activated, wherein the accumulated voltage is indicative of time.

The method of measuring the substance amount or height can also include the step of generating the pulse such that the timing of the pulse is configured to filter out errant reflections. The step of determining the level of the substance can include correlating the signal travel time to the length of cable exposed to air above the surface of the substance within the storage unit. The method can further comprise analyzing the reflected pulse to identify the type of substance within the storage unit.

In embodiments, the amount of the substance is calculated based on the time between the initial start signal generated by the processor to the detect signal detected by the processor. The processor subtracts the time of the known propagation delay, or the time it takes the pulse and the reflected pulse to travel through the each component of the circuit. As described herein, such a calculation can be determined, based on the time it takes the pulse to travel through each circuit component and back to the processor based on its travel path. Discounting the propagation delay, the time it takes the pulse to travel to the substance is multiplied by the speed of electricity to determine the height of the substance at the location of the conductors of the cable.

Figure 12:
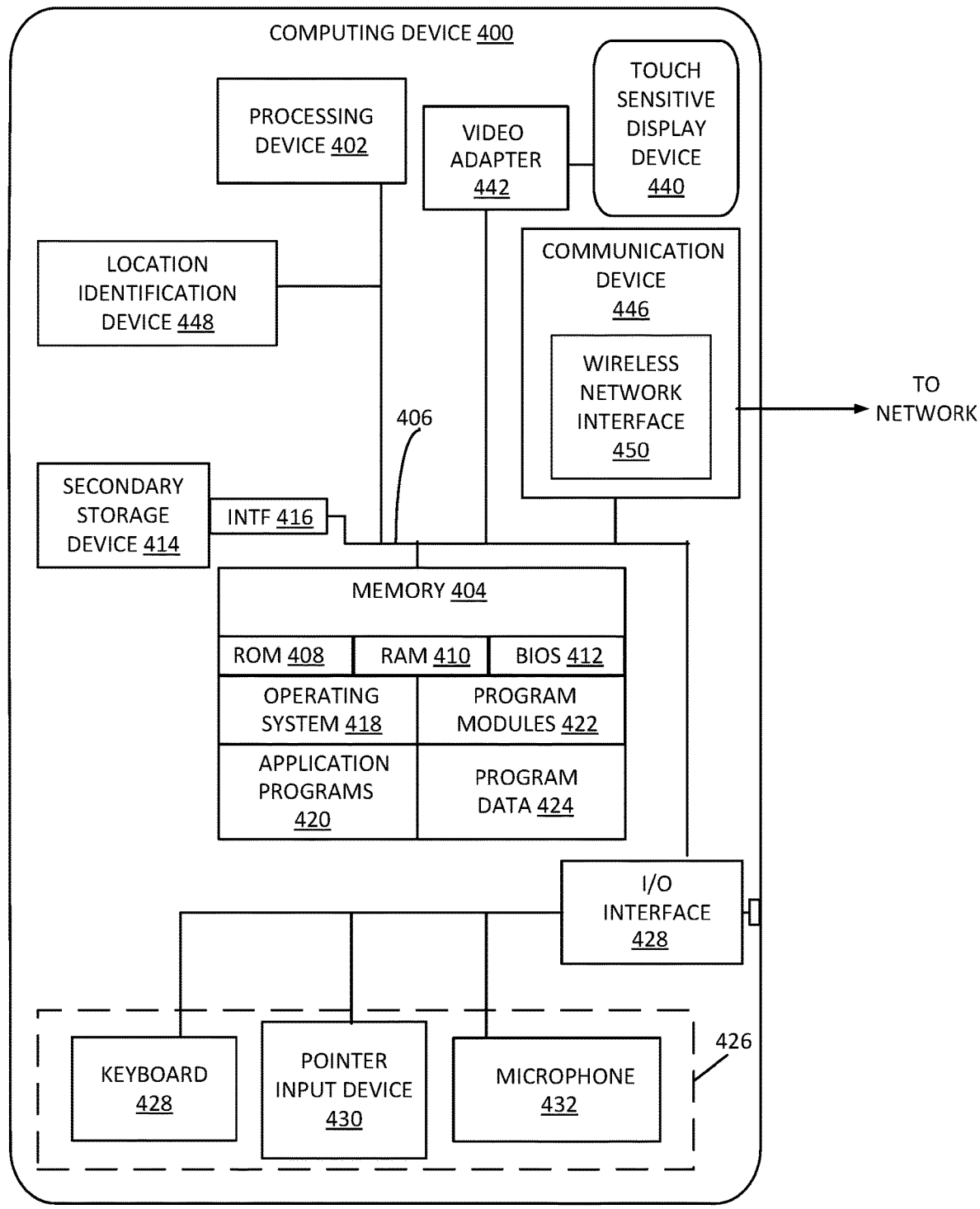
FIG. 12 illustrates an exemplary architecture of a computing device which can be used to implement various devices in the present disclosure.

FIG. 12 illustrates an exemplary architecture of a computing device which can be used to implement various devices in the present disclosure. For example, the computing device 150 can be implemented as the computing device as illustrated in FIG. 12. In other examples, the control device 130 and the switching device 140 are configured to include some or all of the components illustrated in FIG. 12.

The computing device 400 illustrated in FIG. 12 is used to execute the operating system, application programs, and software modules (including the software engines) described herein.

The computing device 400 is a computing device of various types. In some embodiments, the computing device 400 is a mobile computing device. Examples of computing device 400 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices. In other embodiments, the computing device 400 is other computing devices, such as a desktop computer, a laptop computer, or other devices configured to process digital instructions.

It is recognized that the architecture illustrated in FIG. 12 can also be implemented in other computing devices used to achieve aspects of the present disclosure. For example, the computing device 150 can be configured similarly to the architecture of FIG. 12. To avoid undue repetition, this description of computing device 400 will not be separately repeated herein for each of the other computing devices in the system 100.

The computing device 400 includes, in some embodiments, at least one processing device 402, such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures including a memory bus, or memory controller; a peripheral bus; and a local bus using any of a variety of bus architectures.

The system memory 404 includes read only memory 408 and random access memory 410. A basic input/output system 412 containing the basic routines that act to transfer information within the computing device 400, such as during start up, is typically stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage devices and their associated computer readable media provide nonvolatile storage of computer readable instructions (including application programs and program modules), data structures, and other data for the computing device 400.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 414 or memory 404, including an operating system 418, one or more application programs 420, other program modules 422, and program data 424.

In some embodiments, the computing device 400 includes input devices to enable a user to provide inputs to the computing device 400. Examples of input devices 426 include a keyboard 428, a pointer input device 430, a microphone 432, and a touch sensitive display 440. Other embodiments include other input devices. The input devices are often connected to the processing device 402 through an input/output interface 438 that is coupled to the system bus 406. These input devices 426 can be connected by any number of input/output interfaces, such as a parallel port, serial port, game port, or a universal serial bus. Wireless communication between input devices and interface 438 is possible as well, and includes infrared, BLUETOOTH® wireless technology, 802.11a/b/g/n, cellular, or other radio frequency communication systems in some possible embodiments.

In this example embodiment, a touch sensitive display device 440 is also connected to the system bus 406 via an interface, such as a video adapter 442. The touch sensitive display device 440 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 440, the extended medical test apparatus 400 can include various other peripheral devices (not shown), such as speakers or a printer.

The computing device 400 further includes a communication device 446 configured to establish communication across the network. In some embodiments, when used in a local area networking environment or a wide area networking environment (such as the Internet), the computing device 400 is typically connected to the network through a network interface, such as a wireless network interface 450. Other possible embodiments use other wired and/or wireless communication devices. For example, some embodiments of the computing device 400 include an Ethernet network interface, or a modem for communicating across the network. In yet other embodiments, the communication device 446 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 400 typically includes at least some form of computer-readable media. Computer readable media includes any available media that can be accessed by the computing device 400. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 12 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 12, the computing device 400 can include a location identification device 448. The location identification device 448 is configured to identify the location or geolocation of the computing device 400. The location identification device 448 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A cable for use in a system for estimating the amount of a substance in a storage unit, the cable being elongate along a central longitudinal axis defined by the cable, the cable comprising:
a jacket configured to contact the substance contained in the storage unit, the jacket defining a cross-sectional shape perpendicular to the longitudinal axis, the shape defining a first cross-section axis and a second cross-section axis that are perpendicular to each other and perpendicular to the central longitudinal axis, the shape having an elongate dimension parallel to the first cross-section axis, the shape including four straight edges that increase in distance from the first cross-section axis as they approach the second cross-section axis, the shape also including two curved edges, each curved edge connecting two of the straight edges, the first cross-section axis extending through the two curved edges; and
a conductor housed in the jacket and arranged parallel to the central longitudinal axis, the conductor configured to transmit a pulse generated from a time-domain reflectometry based control device and transmit a reflected pulse back to the time-domain reflectometry based control device.

2. The cable of claim 1, further comprising another conductor housed in the jacket and arranged parallel to the central longitudinal axis.

3. The cable of claim 2, wherein the conductor and the another conductor are disposed at opposite end portions of the jacket in cross-sectional view.

4. The cable of claim 1, further comprising a thermocouple.

5. The cable of claim 4, wherein the thermocouple is housed in the jacket.

6. The cable of claim 1, further comprising a strength member housed in the jacket.

7. The cable of claim 6, wherein the strength member is non-metallic.

8. The cable of claim 6, wherein the strength member is centered along the central longitudinal axis.

9. The cable of claim 1, wherein a greatest dimension of the jacket parallel to the first cross-section axis is greater than two times a greatest dimension of the jacket parallel to the second cross-section axis.

10. The cable of claim 1, wherein the cable includes an eyelet.

11. The cable of claim 10, wherein the eyelet is attached to a link, the link being attached to a rafter support member.

12. The cable of claim 1, comprising a plurality of thermocouples.

13. The cable of claim 12, wherein the thermocouples are housed in the jacket.

14. A cable for use in a system for estimating the amount of a substance in a storage unit, the cable being elongate along a central longitudinal axis defined by the cable, the cable comprising:
a jacket configured to contact the substance contained in the storage unit, the jacket defining a cross-sectional shape perpendicular to the longitudinal axis, the shape defining a first cross-section axis and a second cross-section axis that are perpendicular to each other and perpendicular to the central longitudinal axis, the shape having an elongate dimension parallel to the first cross-section axis, the shape including four straight edges that increase in distance from the first cross-section axis as they approach the second cross-section axis, the shape also including two curved edges, each curved edge connecting two of the straight edges, the first cross-section axis extending through the two curved edges; and
first and second conductors housed in the jacket and arranged parallel to the central longitudinal axis, the conductors configured to transmit a pulse generated from a time-domain reflectometry based control device and transmit a reflected pulse back to the time-domain reflectometry based control device; and
a strength member housed in the jacket and centered along the central longitudinal axis.

15. The cable of claim 14, further comprising a thermocouple.

16. The cable of claim 15, wherein the thermocouple is housed in the jacket.

17. The cable of claim 14, wherein a greatest dimension of the jacket parallel to the first cross-section axis is greater than two times a greatest dimension of the jacket parallel to the second cross-section axis.

* * * * *